O. W. HART.
ROLLER BEARING.
APPLICATION FILED JUNE 8, 1917.

1,262,337.

Patented Apr. 9, 1918.

INVENTOR
Orlando W Hart
by William A. Hardy
HIS ATTY.

UNITED STATES PATENT OFFICE.

ORLANDO W. HART, OF FALL RIVER, MASSACHUSETTS.

ROLLER-BEARING.

1,262,337.  Specification of Letters Patent.  Patented Apr. 9, 1918.

Application filed June 8, 1917. Serial No. 173,472.

*To all whom it may concern:*

Be it known that I, ORLANDO W. HART, a citizen of the United States, and a resident of Fall River, Bristol county, Massachusetts, have invented certain new and useful Improvements in Roller-Bearings, of which the following is a description.

My invention relates to roller bearings and more particularly to that type of roller bearings described in Patent 1,205,449 granted to me on November 21, 1916, and entitled Roller bearings.

The principal objects of my invention are to provide an improved construction and arrangement for maintaining the component parts of a roller bearing assembled in proper relative position and for taking up side thrusts to which the bearing may be subjected.

A further object of my invention is to provide a structure for attaining these results which is of simple construction, which may be quickly and readily assembled, and the use of which is accompanied with a minimum of friction.

Other features of my invention reside in the construction of parts and combinations of elements hereinafter more fully described and claimed.

In order that my invention may be more clearly understood, attention is directed to the drawing accompanying and forming a part of this specification, in the several views of which corresponding parts are designated by the same reference characters, and in which.

Figure 1:
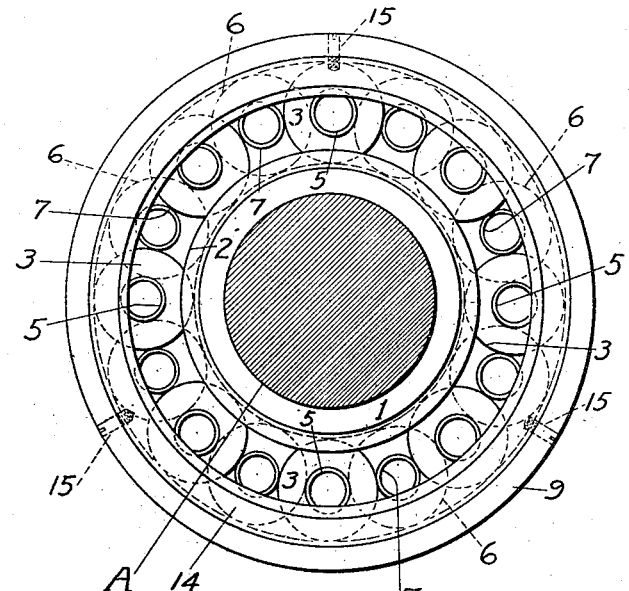
Figure 1 is a view in end elevation, partly in section, of a roller bearing of the type described in my patent referred to above, illustrating one embodiment of my invention.

Referring to the drawing, reference character A represents a shaft having rigidly secured thereto, in any suitable manner, a hardened cylindrical bushing or sleeve 1. The bushing 1 is provided with outwardly extending end flanges 2 whereby a runway for the rollers of the bearing is provided between such flanges. A plurality of annular series of rolls, three such series, C, B and D being shown in the drawing, are assembled around the bushing 1, the corresponding rolls 3 and 4 of the alternate or two outside series B and D being respectively rotatably mounted on hollow shafts 5 and the rolls 6 of the intermediate series C being respectively rotatably mounted on hollow shafts 7. Each of the shafts 5 and 7 is parallel to the axis of the bearing and of a length substantially equal to the three series of rolls B, C and D, and the shafts and rolls of each series of rolls respectively coact with the rolls and shafts of adjacent series to maintain the rolls of each two adjacent series of rolls of the bearing in staggered relation, in the manner described in Patent 1,205,449 hereinbefore referred to. The hollow shafts 5 and 7 are preferably provided with perforations 8 and consequently lubricant is adapted to be thoroughly distributed to all parts of the bearing in the rotation of the rolls on their shafts and in the rotation of the series of rolls B, C and D about the axis of the bearing.

Figure 2:
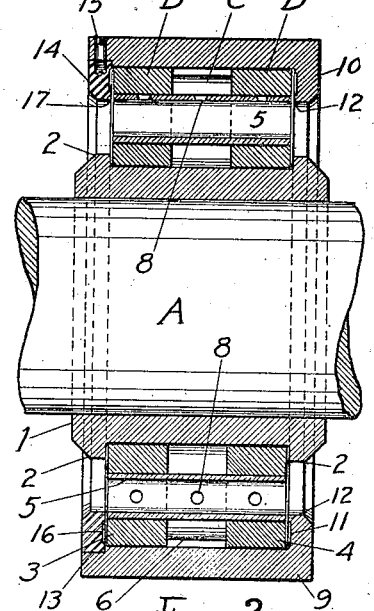
Fig. 2 is a central vertical sectional view, partly in elevation, of the device shown in Fig. 1.

After the rolls of the series B, C and D have been assembled about the bushing or sleeve 1 and the hollow shafts 5 and 7 have been inserted in position as shown, an outer hardened cylindrical bearing member or sleeve 9 is slipped endwise over the rolls to the position shown in Fig. 2 in which it serves to hold the roll assembly in proper relation to the sleeve 1. The cylindrical bearing member or sleeve 9 is provided at one end with an inwardly extending annular flange 10 of a width sufficient to overlap the corresponding ends of the hollow shafts 5 and 7 so as to prevent endwise movement of these shafts to the right (Fig. 2) relative to the rolls 3, 4 and 6. The inner surface of the flange 10 is preferably provided with an annular recess 11 whereby the flange is formed with an inner annular lip 12 which overlies the adjacent ends of shafts 5 and 7. The recess 11 is preferably almost as wide as the portion of the end roll surfaces of the bearing which the flange 10 overlaps, and serves to reduce the bearing surfaces of such flange and the rolls 4 and thereby the friction therebetween to a minimum.

That end of the sleeve or bearing member 9 opposite the end provided with flange 10 is preferably provided with an inner annular recess 13 forming a seat for a ring 14. The ring 14 is removably secured in position, as shown in Figs. 1 and 2, by means of screws 15 which have smooth shanks extending through smooth bored radially extending openings in the sleeve 9 and screw-threaded inner ends threaded into corresponding radially extending openings in the ring. The ring 14 constitutes, in effect, an end flange for the sleeve 9 corresponding but opposed to the flange 10 and is of such a width as to overlap the adjacent ends of the shafts 5 and 7 so as to prevent endwise movement of these shafts to the left (Fig. 2) relative to the rolls 3, 4 and 6. The inner surface of ring 14 is preferably provided with an annular recess 16 and thereby an inner annular lip 17, corresponding to and for the same purposes as recess 11 and annular lip 12 respectively of flange 10.

By the construction described it will be apparent that the parts of the bearing will be held in proper assembled position about the sleeve 1 and any substantial longitudinal or endwise movement of the hollow shafts 5 and 7 with respect to the rolls 3, 4 and 6, will be prevented. Moreover by reason of the flange 10 and ring 14 of sleeve 9 and the end flanges 2 of sleeve 1, which overlap portions of the end roll surfaces of the bearing, it will be seen that any side or end thrust imposed on either of the sleeves 1 and 9 will be transmitted through the rolls 3, 4 and 6 and be taken up by the other sleeve.

The ring removably secured to the sleeve 9 and constituting one end flange of the latter, may be retained in position in other ways than that shown in Figs. 1 and 2.

Figure 3:
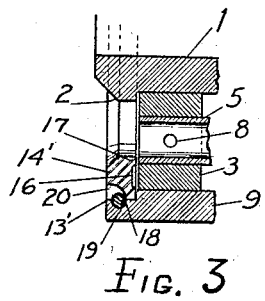
Figs. 3 and 4 are fragmental sectional views showing modifications of a detail of my invention.

In Fig. 3 the ring 14', which corresponds to the ring 14 of Figs. 1 and 2, seats in the inner annular recess 13 provided therefor at one end of sleeve 9 where it is securely but removably held by means of the split snap ring 18. The bottom of the recess 13 is provided with an annular groove 19, forming a seat for ring 18, and the outer edge portion of ring 14' is provided with an annular groove 20 permitting the positioning and removal of the snap ring 19.

Figure 4:
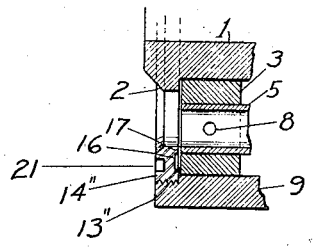

In Fig. 4 the ring 14'', which corresponds to the ring 14 of Figs. 1 and 2, is in adjustable screw threaded engagement with the bottom of the annular recess 13'' provided therefor at one end of sleeve 9. Holes, such as shown at 21, may be provided in ring 14'' to facilitate the application and removal of ring 14'' by means of a spanner wrench. By turning ring 14'' the same may be readily adjusted to proper position at any time and to compensate for wear of the parts of the bearing.

It is to be understood that the construction described and shown are illustrative only, and that the same are subject to various changes in size, form and arrangement of parts without any departure from the spirit of my invention and the scope of the appended claims.

Having now described my invention, what I claim and desire to protect by Letters Patent is as follows:

1. In a roller bearing, a plurality of annular series of rolls, shafts on which the rolls of each series are respectively mounted, and a cylindrical casing within which said series are disposed, said casing being provided with annular end flanges extending inwardly over and adapted to bear against the respective ends of said shafts.

2. In a roller bearing, an annular series of rolls, and a hollow cylindrical bearing member within which said rolls are disposed, said member being provided with annular end flanges extending inwardly over and adapted to bear against the respective end roll surfaces of the bearing, the inner surfaces of said flanges being recessed between inner and outer bearing portions thereof to reduce the friction between such flanges and said roll surfaces.

3. In a roller bearing, an outer cylindrical bearing member adapted to receive a series of rolls, said bearing member having inwardly extending end flanges adapted to bear against the respective end roll surfaces of the bearing, one of said flanges having the inner surface between inner and outer bearing portions thereof recessed.

4. In a roller bearing, a hollow cylindrical bearing member adapted to receive a series of rolls, said bearing member having an inwardly extending end flange adapted to bear against the respective end roll surfaces of the bearing and consisting of a ring threaded to said member, said ring having spaced bearing portions and an intermediate recessed portion.

5. In a roller bearing, a cylindrical bearing member for a series of rolls, said bearing member having annular end flanges adapted to bear against the end roll surfaces of the bearing respectively, one of said flanges comprising a member removably and adjustably secured to said bearing member, and one of said flanges having a recessed portion intermediate bearing portions thereof.

6. In a roller bearing, one or more annular series of rolls, shafts of uniform diameter on which the rolls of each series are respectively loosely and axially mounted, and a cylindrical bearing member for said rolls provided with end flanges, said flanges being of such width as to overlap the ends of said shafts, and said flanges having portions adapted to bear against the respective end roll surfaces of the bearing and portions adapted to bear against the respective ends of said shafts.

7. In a roller bearing, one or more annular series of rolls, shafts on which the rolls of each series are respectively loosely mounted, and a cylindrical bearing member for said rolls provided with end flanges adapted to bear against the respective end roll surfaces of the bearing, said flanges being of such width as to overlap the ends of said shafts, and the inner surface of each flange being provided with an annular recess intermediate annular bearing portions thereof.

8. In a roller bearing, one or more annular series of rolls, shafts on which the rolls of each series are respectively loosely mounted, and outer and inner cylindrical bearing members between which said rolls are disposed, said bearing members being each provided with end flanges overlapping the end roll surfaces of the bearing, a flange at each end of the bearing overlapping the respective ends of said shafts, and one of the flanges of one of the bearing members comprising a member removably secured to the latter.

9. In a roller bearing, an annular series of rolls, shafts on which the rolls are respectively mounted, and a casing within which said rolls are disposed, said casing being provided with an inwardly extending end flange adapted to bear against the adjacent end of said shafts.

10. In a roller bearing, an annular series of rolls, and a hollow bearing member within which said rolls are disposed, said member being provided with an inwardly extending end flange adapted to bear against the adjacent end roll surface of the bearing, the inner surface of said flange being recessed between inner and outer bearing portions thereof to reduce the friction between such flange and said roll surface.

11. In a roller bearing, a hollow bearing member adapted to receive a series of rolls, said bearing member having an inwardly extending end flange adapted to bear against the adjacent end roll surface of the bearing, said flange having the inner surface between inner and outer bearing portions thereof recessed.

This specification signed and witnessed this 6th day of June, 1917.

ORLANDO W. HART.

Witnesses:
HARRY H. PICKING,
M. L. INGERSOLL.